(12) United States Patent
West et al.

(10) Patent No.: US 11,340,372 B2
(45) Date of Patent: May 24, 2022

(54) SEISMIC SURVEY

(71) Applicant: Magseis FF LLC, Houston, TX (US)

(72) Inventors: Paul West, Houston, TX (US); Terence Hibben, Houston, TX (US)

(73) Assignee: MAGSEIS FF LLC, Houston, TX (US)

( * ) Notice: Subject to any disclaimer, the term of this patent is extended or adjusted under 35 U.S.C. 154(b) by 332 days.

(21) Appl. No.: 16/738,795

(22) Filed: Jan. 9, 2020

(65) Prior Publication Data

US 2021/0215844 A1    Jul. 15, 2021

(51) Int. Cl.
*G01V 1/38* (2006.01)
*B63B 21/66* (2006.01)
*G01V 1/20* (2006.01)

(52) U.S. Cl.
CPC ............ *G01V 1/3808* (2013.01); *B63B 21/66* (2013.01); *G01V 1/201* (2013.01); *G01V 1/3817* (2013.01); *G01V 1/3852* (2013.01); *G01V 1/3861* (2013.01)

(58) Field of Classification Search
CPC .... G01V 1/3808; G01V 1/201; G01V 1/3817; G01V 1/3852; G01V 1/3861; B63B 21/66
See application file for complete search history.

(56) References Cited

U.S. PATENT DOCUMENTS

| | | | |
|---|---|---|---|
| 2006/0227658 A1* | 10/2006 | Toennessen | B63B 21/663 367/18 |
| 2008/0175097 A1* | 7/2008 | Storteig | G01V 1/3861 367/16 |
| 2012/0147701 A1* | 6/2012 | Ross | G01V 1/3861 367/23 |
| 2020/0073000 A1* | 3/2020 | Rogers | G01V 1/3808 |

FOREIGN PATENT DOCUMENTS

WO    WO-0116623 A1 *    3/2001    ............ B63B 21/66

* cited by examiner

*Primary Examiner* — Ian J Lobo
(74) *Attorney, Agent, or Firm* — Sage Patent Group

(57) ABSTRACT

A seismic survey system is provided. The system can include a source array including a first sub-source array and a second sub-source array. The system can include a streamer coupled with the first sub-source array and a streamer coupled with the second sub-source array. The system can include a receiver array including a plurality of receivers. The system can include a lateral cable coupled with at least one of a first diverter or a second diverter and at least one of the first sub-source array or the second sub-source array. The system can include a positioning cable coupled with the first diverter and a positioning cable coupled with the second diverter. The system can include a power cable. The system can include a seismic data acquisition unit array including a plurality of seismic data acquisition units disposed on a seabed.

20 Claims, 10 Drawing Sheets

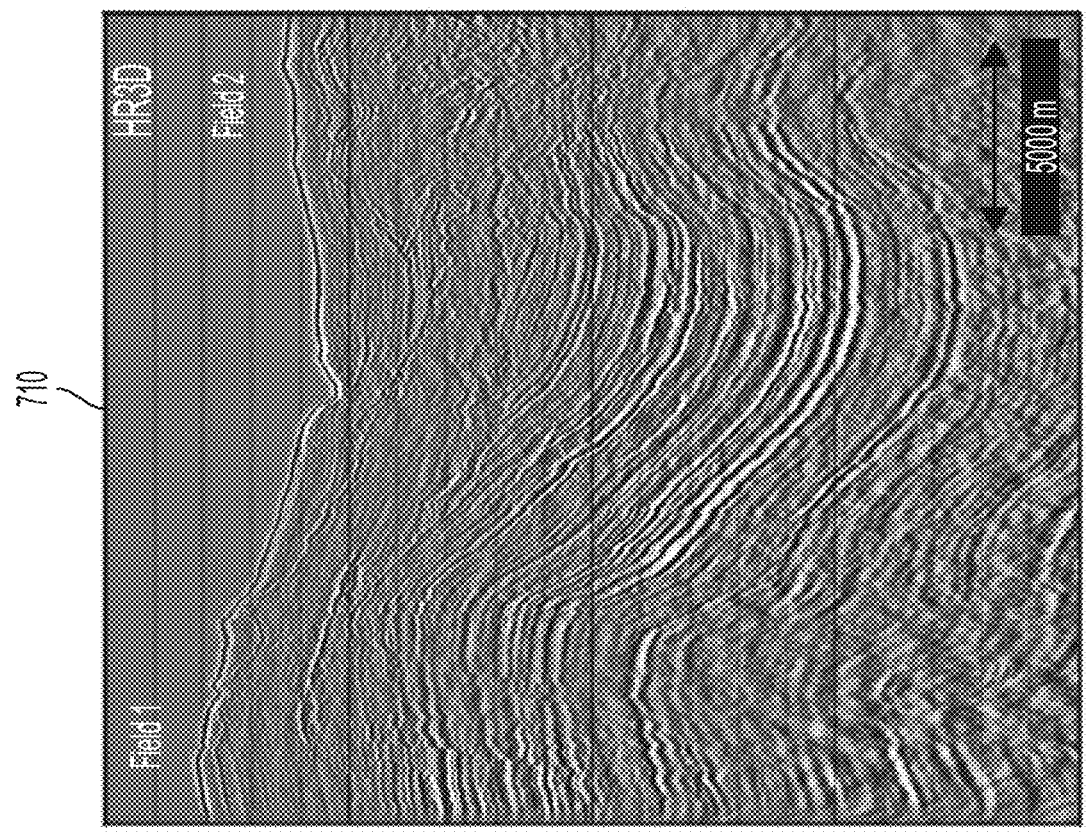
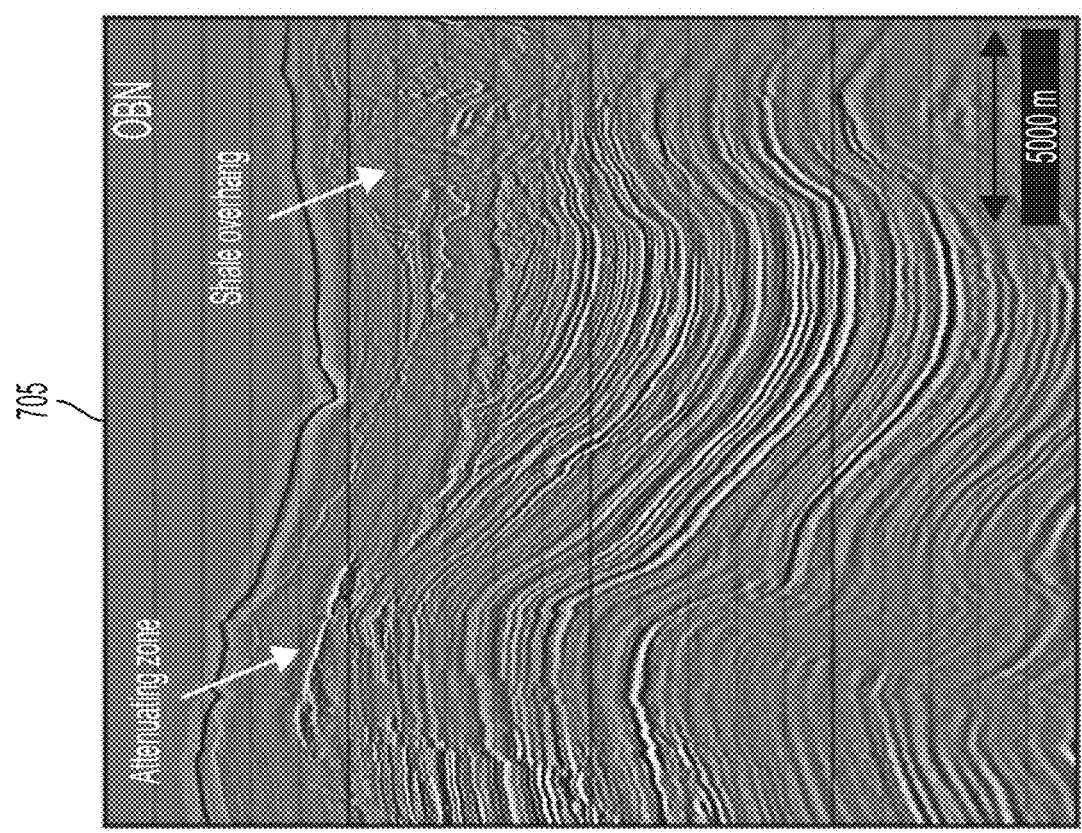
FIG. 7

SEISMIC SURVEY

BACKGROUND

Seismic or other operations performed on a piece of earth can identify subterranean characteristics or features of the analyzed piece of earth.

SUMMARY

At least one aspect of the present disclosure is directed to a seismic survey system. The seismic survey system can include a source array including a first sub-source array and a second sub-source array. The seismic survey system can include a streamer coupled with the first sub-source array. The seismic survey system can include a streamer coupled with the second sub-source array. The seismic survey system can include a receiver array including a plurality of receivers. A first subset of the plurality of receivers can be coupled with the streamer coupled with the first sub-source array. A second subset of the plurality of receivers can be coupled with the streamer coupled with the second sub-source array. The seismic survey system can include a lateral cable coupled with at least one of a first diverter or a second diverter and at least one of the first sub-source array or the second sub-source array. The seismic survey system can include a positioning cable coupled with the first diverter and trailing from a vessel. The seismic survey system can include a positioning cable coupled with the second diverter and trailing from the vessel. The seismic survey system can include a power cable coupled with the first sub-source array and trailing from the vessel. The seismic survey system can include a power cable coupled with the second sub-source array and trailing from the vessel. The seismic survey system can include a seismic data acquisition unit array including a plurality of seismic data acquisition units disposed on a seabed, each seismic data acquisition unit of the plurality of seismic data acquisition units spaced a threshold distance apart.

At least one aspect of the present disclosure is directed to a method of seismic surveying. The method can include deploying a source array including a streamer coupled with a first sub-source array and a streamer coupled with a second sub-source array. The method can include deploying a receiver array including a plurality of receivers, a first subset of the plurality of receivers coupled with the streamer coupled with the first sub-source array and a second subset of the plurality of receivers coupled with the streamer coupled with the second sub-source array. The method can include providing a lateral cable coupled with at least one of a first diverter or a second diverter and at least one of the first sub-source array or the second sub-source array. The method can include providing a positioning cable coupled with the first diverter and trailing from a vessel and a positioning cable coupled with the second diverter and trailing from the vessel. The method can include providing a plurality of power cables, trailing from the vessel, coupled with at least one of the first sub-source array or the second sub-source array. The method can include providing a seismic data acquisition unit array including a plurality of seismic data acquisition units disposed on a seabed, each seismic data acquisition unit of the plurality of seismic data acquisition units spaced a threshold distance apart.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 7 illustrates data from a plurality of seismic data acquisition units and near offset data according to an example implementation.

Like reference numbers and designations in the various drawings indicate like elements.

DETAILED DESCRIPTION

Reflection-based surveys described herein can obtain information relating to subsurface features. An acoustic signal can reflect off subsurface lithological formations and be acquired, analyzed and interpreted. However, sparse node reflection-based surveys typically provide inferior, poorly sampled imagery of the near surface geology. Data obtained from a reflection-based survey using ocean bottom seismometers and receivers disposed on short streamers can provide useful information without adding substantial cost. For example, near offset data can be collected during the normal course of a seismic survey using ocean bottom seismometers. Data obtained from a reflection-based survey using ocean bottom seismometers and receivers disposed on short streamers can give the speed, equipment use efficiency, deployment and retrieval efficiency of a sparse node survey, while offsetting the loss of near offsets usually associated with the spare node survey.

The present disclosure is directed to systems and methods for performing a seismic survey. For example, the seismic survey system can include a source array. The source array can include a first sub-source array and a second sub-source array. The seismic survey system can include a streamer coupled with the first sub-source array. The seismic survey system can include a streamer coupled with the second sub-source array. The seismic survey system can include a receiver array including a plurality of receivers. A first subset of the plurality of receivers can be coupled with the streamer coupled with the first sub-source array. A second subset of the plurality of receivers can be coupled with the streamer coupled with the second sub-source array. The seismic survey system can include a lateral cable coupled with at least one of a first diverter or a second diverter and at least one of the first sub-source array or the second sub-source array. The seismic survey system can include a positioning cable coupled with the first diverter and trailing from a vessel. The seismic survey system can include a positioning cable coupled with the second diverter and trailing from the vessel. The seismic survey system can include a power cable coupled with the first sub-source array and trailing from the vessel. The seismic survey system can include a power cable coupled with the second sub-source array and trailing from the vessel. The seismic survey system can include a seismic data acquisition unit array including a plurality of seismic data acquisition units disposed on a seabed, each seismic data acquisition unit of the plurality of seismic data acquisition units spaced a threshold distance apart.

Figure 1:
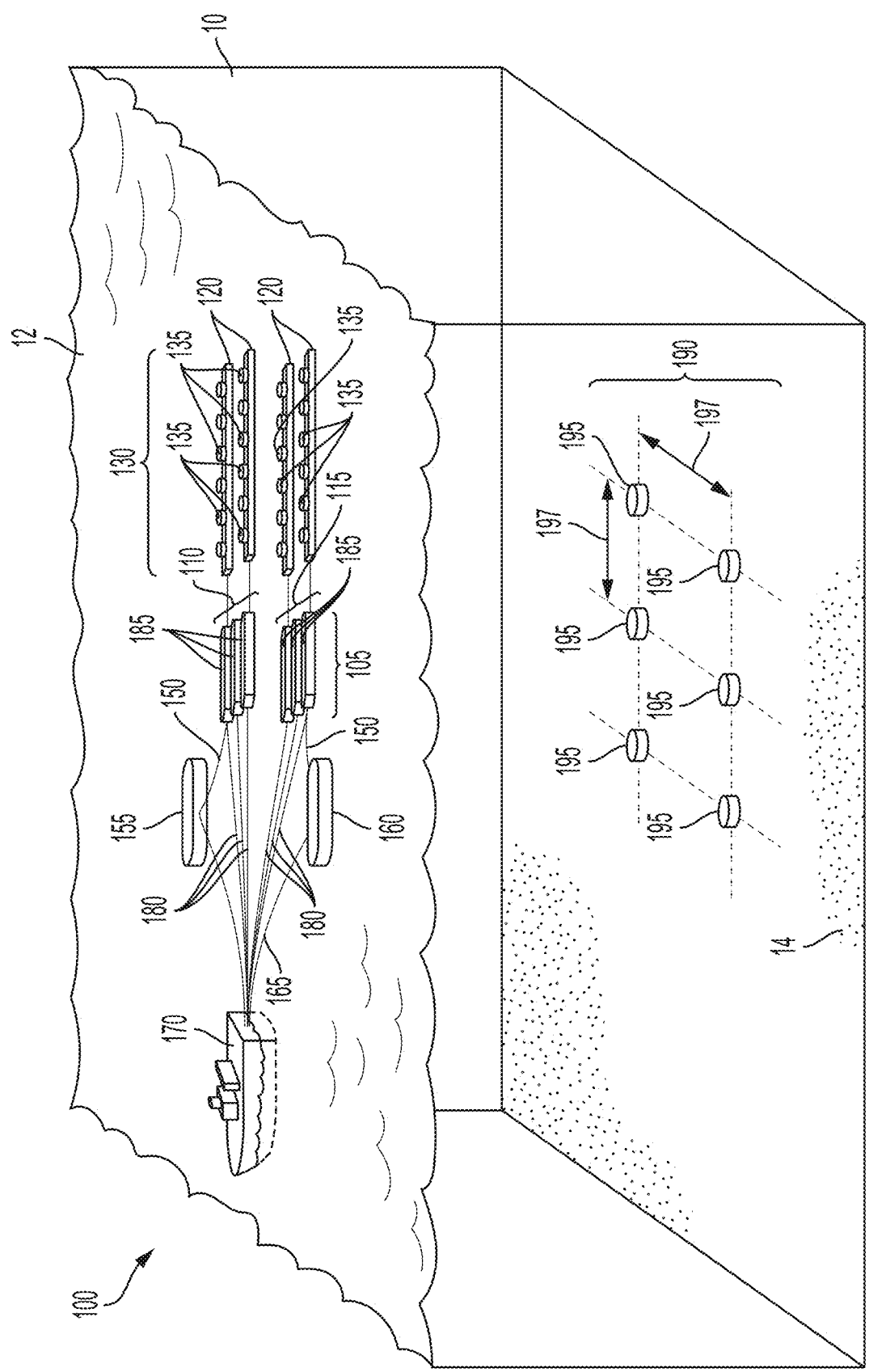
FIG. 1 illustrates a seismic survey system according to an example implementation.

FIG. 1 illustrates an example seismic survey system 100 illustrative of a marine environment in which the systems and methods of the present disclosure can perform a seismic survey to detect seabed objects. The seismic survey system 100 can include a source array 105. The source array 105 can generate an acoustic signal. The source array 105 can generate a source shot. The source array 105 can be an electrical source. The source array 105 can be an acoustic source. The source array 105 can include a first sub-source array 110. For example, the first sub-source array 110 can generate an acoustic signal. The first sub-source array 110 can generate a source shot. The first sub-source array 110 can be an electrical source. The first sub-source array 110 can be an acoustic source. The source array 105 can include a second sub-source array 115. For example, the second sub-source array 115 can generate an acoustic signal. The second sub-source array 115 can generate a source shot. The second sub-source array 115 can be an electrical source. The second sub-source array 115 can be an acoustic source. The second sub-source array 115 can be separated from the first sub-source array 110 by a distance of 50 meters.

The seismic survey system 100 can include a float 185. The float 185 can include a first float of the first sub-source array 110. The float 185 can include a second float of the first sub-source array 110. The float 185 can include a third float of the first sub-source array 110. The first sub-source array 110 can include the first float of the first sub-source array 110. The first sub-source array 110 can include the second float of the first sub-source array 110. The first sub-source array 110 can include the third float of the first sub-source array 110. The float 185 can include a first float of the second sub-source array 115. The float 185 can include a second float of the second sub-source array 115. The float 185 can include a third float of the second sub-source array 115. The second sub-source array 115 can include a first float of the second sub-source array 115. The second sub-source array 115 can include the second float of the second sub-source array 115. The second sub-source array 115 can include the third float of the second sub-source array 115.

The seismic survey system 100 can include a streamer 120. The streamer 120 can be coupled with the first sub-source array 110. The streamer 120 can be coupled with the second sub-source array 115. For example, the streamer 120 may be a cable (e.g., a surface marine cable), an assembly of wires, or any component capable of connecting a receiver to a recording device which may be located on a vessel 170. The streamer 120 can be directly coupled with the first sub-source array 110. For example, the streamer 120 can be mounted on the first sub-source array 110. The streamer 120 can be indirectly coupled to the first sub-source array 110. For example, the streamer 120 can be coupled to the first sub-source array 110 via a cable. The streamer 120 can be directly coupled with the second sub-source array 115. For example, the streamer 120 can be mounted on the second sub-source array 115. The streamer 120 can be indirectly coupled to the second sub-source array 115. For example, the streamer 120 can be coupled to the second sub-source array 115 via a cable. The streamer 120 can be less than 200 meters. The streamer 120 can include a first streamer, a second streamer, a third streamer, or a fourth streamer. The streamer 120 can include a first sub-source array streamer. The streamer 120 can include a second sub-source array streamer.

The streamer 120 coupled with the first sub-source array 110 can include a first streamer coupled with the first sub-source array 110. The first streamer coupled with the first sub-source array 110 can be coupled with the float 185 of the first sub-source array 110. For example, the first streamer coupled with the first sub-source array 110 can be coupled with the first float of the first sub-source array 110. The first streamer coupled with the first sub-source array 110 can be coupled with the second float of the first sub-source array 110. The first streamer coupled with the first sub-source array 110 can be coupled with the third float of the first sub-source array 110. The first streamer coupled with the first sub-source array 110 can be directly coupled to the float 185 of the first sub-source array 110. For example, the first streamer coupled with the first sub-source array 110 can be mounted on the float 185 of the first sub-source array 110. The first streamer coupled with the first sub-source array 110 can be indirectly coupled to the float 185 of the first sub-source array 110. For example, the first streamer coupled with the first sub-source array 110 can be coupled to the float 185 of the first sub-source array 110 via a cable.

The streamer 120 coupled with the first sub-source array 110 can include a first streamer. The first streamer can be coupled with the float 185 of the first sub-source array 110. For example, the first streamer can be coupled with the first float of the first sub-source array 110. The first streamer can be coupled with the second float of the first sub-source array 110. The first streamer can be coupled with the third float of the first sub-source array 110. The first streamer can be directly coupled to the float 185 of the first sub-source array 110. For example, the first streamer can be mounted on the float 185 of the first sub-source array 110. The first streamer can be indirectly coupled to the float 185 of the first sub-source array 110. For example, the first streamer can be coupled to the float 185 of the first sub-source array 110 via a cable.

The streamer 120 coupled with the second sub-source array 115 is a first streamer coupled with the second sub-source array 115. The first streamer coupled with the second sub-source array 115 can be coupled with the float 185 of the second sub-source array 115. For example, the first streamer coupled with the second sub-source array 115 can be coupled with the first float of the second sub-source array 115. The first streamer coupled with the second sub-source array 115 can be coupled with the second float of the second sub-source array 115. The first streamer coupled with the second sub-source array 115 can be coupled with the third float of the second sub-source array 115. The first streamer coupled with the second sub-source array 115 can be directly coupled to the float 185 of the second sub-source array 115. For example, the first streamer coupled with the second sub-source array 115 can be mounted on the float 185 of the second sub-source array 115. The first streamer coupled with the second sub-source array 115 can be indirectly coupled to the float 185 of the second sub-source array 115. For example, the first streamer coupled with the second sub-source array 115 can be coupled to the float 185 of the second sub-source array 115 via a cable.

The streamer 120 coupled with the second sub-source array 115 can include a second streamer. The second streamer can be coupled with the float 185 of the second sub-source array 115. For example, the second streamer can be coupled with the first float of the second sub-source array 115. The second streamer can be coupled with the second float of the second sub-source array 115. The second streamer can be coupled with the third float of the second sub-source array 115. The second streamer can be directly coupled to the float 185 of the second sub-source array 115. For example, the second streamer can be mounted on the float 185 of the second sub-source array 115. The second streamer can be indirectly coupled to the float 185 of the second sub-source array 115. For example, the second streamer can be coupled to the float 185 of the second sub-source array 115 via a cable.

The streamer 120 coupled with the first sub-source array 110 can include a second streamer coupled with the first sub-source array 110. The second streamer coupled with the first sub-source array 110 can be coupled with the float 185 of the first sub-source array 110. For example, the second streamer coupled with the first sub-source array 110 can be coupled with the first float of the first sub-source array 110. The second streamer coupled with the first sub-source array 110 can be coupled with the second float of the first sub-source array 110. The second streamer coupled with the first sub-source array 110 can be coupled with the third float of the first sub-source array 110. The second streamer coupled with the first sub-source array 110 can be directly coupled to the float 185 of the first sub-source array 110. For example, the second streamer coupled with the first sub-source array 110 can be mounted on the float 185 of the first sub-source array 110. The second streamer coupled with the first sub-source array 110 can be indirectly coupled to the float 185 of the first sub-source array 110. For example, the second streamer coupled with the first sub-source array 110 can be coupled to the float 185 of the first sub-source array 110 via a cable.

The streamer 120 coupled with the first sub-source array 110 can include a third streamer. The third streamer can be coupled with the float 185 of the first sub-source array 110. For example, the third streamer can be coupled with the first float of the first sub-source array 110. The third streamer can be coupled with the second float of the first sub-source array 110. The third streamer can be coupled with the third float of the first sub-source array 110. The third streamer can be directly coupled to the float 185 of the first sub-source array 110. For example, the third streamer can be mounted on the float 185 of the first sub-source array 110. The third streamer can be indirectly coupled to the float 185 of the first sub-source array 110. For example, the third streamer can be coupled to the float 185 of the first sub-source array 110 via a cable.

The streamer 120 coupled with the second sub-source array 115 can include a second streamer coupled with the second sub-source array 115. The second streamer coupled with the second sub-source array 115 can be coupled with the float 185 of the second sub-source array 115. For example, the second streamer coupled with the second sub-source array 115 can be coupled with the first float of the second sub-source array 115. The second streamer coupled with the second sub-source array 115 can be coupled with the second float of the second sub-source array 115. The second streamer coupled with the second sub-source array 115 can be coupled with the third float of the second sub-source array 115. The second streamer coupled with the second sub-source array 115 can be directly coupled to the float 185 of the second sub-source array 115. For example, the second streamer coupled with the second sub-source array 115 can be mounted on the float 185 of the second sub-source array 115. The second streamer coupled with the second sub-source array 115 can be indirectly coupled to the float 185 of the second sub-source array 115. For example, the second streamer coupled with the second sub-source array 115 can be coupled to the float 185 of the second sub-source array 115 via a cable.

The streamer 120 coupled with the second sub-source array 115 can include a fourth streamer. The fourth streamer can be coupled with the float 185 of the second sub-source array 115. For example, the fourth streamer can be coupled with the first float of the second sub-source array 115. The fourth streamer can be coupled with the second float of the second sub-source array 115. The fourth streamer can be coupled with the third float of the second sub-source array 115. The fourth streamer can be directly coupled to the float 185 of the second sub-source array 115. For example, the fourth streamer can be mounted on the float 185 of the second sub-source array 115. The fourth streamer can be indirectly coupled to the float 185 of the second sub-source array 115. For example, the fourth streamer can be coupled to the float 185 of the second sub-source array 115 via a cable.

The seismic survey system 100 can include a receiver array 130. The receiver array 130 can receive reflection data generated by an acoustic signal. The receiver array 130 can include a plurality of receivers 135. The plurality of receivers 135 can be coupled with the streamer 120. The plurality of receivers 135 can receive reflection data reflected off an object in a seabed. For example, a receiver of the plurality of receivers 135 may be a hydrophone or any other device capable of collecting seismic data. Seismic data can include reflection data indicating subsurface features of the seabed. The plurality of receivers 135 can be configured to detect acoustic waves that are reflected by seabed objects. The plurality of receivers 135 can include a first subset of the plurality of receivers 135. The plurality of receivers 135 can include a second subset of the plurality of receivers 135. The plurality of receivers 135 can include a third subset of the plurality of receivers 135. The plurality of receivers 135 can include a fourth subset of the plurality of receivers 135.

A first subset of the plurality of receivers 135 can be coupled with the streamer 120. For example, the first subset of the plurality of receivers 135 can be coupled with the streamer coupled with the first sub-source array 110. The first subset of the plurality of receivers 135 can be disposed on the streamer coupled with the first sub-source array 110. The first subset of the plurality of receivers 135 can be coupled with the streamer coupled with the first streamer. For example, the first subset of the plurality of receivers 135 can be disposed on the first streamer. The first subset of the plurality of receivers 135 can receive reflection data reflected off an object in a seabed. For example, a receiver of the first subset of the plurality of receivers 135 may be a hydrophone or any other device capable of collecting seismic data. The first subset of the plurality of receivers 135 can be configured to detect acoustic waves that are reflected by seabed objects. The first subset of the plurality of receivers 135 can receive reflection data generated by an acoustic signal.

A second subset of the plurality of receivers can be coupled with the streamer 120. For example, the second subset of the plurality of receivers 135 can be coupled with the streamer coupled with the second sub-source array 115. The second subset of the plurality of receivers 135 can be disposed on the streamer coupled with the second sub-source array 115. The second subset of the plurality of receivers 135 can be coupled with the streamer coupled with the second streamer. For example, the second subset of the plurality of receivers 135 can be disposed on the second streamer. The second subset of the plurality of receivers 135 can receive reflection data reflected off an object in a seabed. For example, a receiver of the second subset of the plurality of receivers 135 may be a hydrophone or any other device capable of collecting seismic data. The second subset of the plurality of receivers 135 can be configured to detect acoustic waves that are reflected by seabed objects. The second subset of the plurality of receivers 135 can receive reflection data generated by an acoustic signal.

A third subset of the plurality of receivers 135 can be coupled with the streamer 120. For example, the third subset of the plurality of receivers 135 can be coupled with the streamer coupled with the first sub-source array 110. The third subset of the plurality of receivers 135 can be disposed on the streamer coupled with the first sub-source array 110. The third subset of the plurality of receivers 135 can be coupled with the streamer coupled with the third streamer. For example, the third subset of the plurality of receivers 135 can be disposed on the third streamer. The third subset of the plurality of receivers 135 can receive reflection data reflected off an object in a seabed. For example, a receiver of the third subset of the plurality of receivers 135 may be a hydrophone or any other device capable of collecting seismic data. The third subset of the plurality of receivers 135 can be configured to detect acoustic waves that are reflected by seabed objects. The third subset of the plurality of receivers 135 can receive reflection data generated by an acoustic signal.

A fourth subset of the plurality of receivers can be coupled with the streamer 120. For example, the fourth subset of the plurality of receivers 135 can be coupled with the streamer coupled with the second sub-source array 115. The fourth subset of the plurality of receivers 135 can be disposed on the streamer coupled with the second sub-source array 115. The fourth subset of the plurality of receivers 135 can be coupled with the streamer coupled with the fourth streamer. For example, the fourth subset of the plurality of receivers 135 can be disposed on the fourth streamer. The fourth subset of the plurality of receivers 135 can receive reflection data reflected off an object in a seabed. For example, a receiver of the fourth subset of the plurality of receivers 135 may be a hydrophone or any other device capable of collecting seismic data. The fourth subset of the plurality of receivers 135 can be configured to detect acoustic waves that are reflected by seabed objects. The fourth subset of the plurality of receivers 135 can receive reflection data generated by an acoustic signal.

The seismic survey system 100 can include a lateral cable 150. The lateral cable 150 can be coupled with at least one of a first diverter 155 or a second diverter 160 and at least one of the first sub-source array 110 or the second sub-source array 115. For example, the lateral cable 150 can be coupled with the first diverter 155 and the first sub-source array 110. The lateral cable 150 can be directly coupled with the first diverter 155 and the first sub-source array 110. For example, the lateral cable 150 can be mounted on the first diverter 155. The lateral cable 150 can be indirectly coupled with the first diverter 155 and the first sub-source array 110. For example, the lateral cable 150 can be coupled with the first sub-source array 110 via a cable. The lateral cable 150 can be coupled with the first diverter 155 and the second sub-source array 115. The lateral cable 150 can be directly coupled with the first diverter 155 and the second sub-source array 115. For example, the lateral cable 150 can be mounted on the first diverter 155. The lateral cable 150 can be indirectly coupled with the first diverter 155 and the second sub-source array 115. For example, the lateral cable 150 can be coupled with the second sub-source array 115 via a cable.

The lateral cable 150 can be coupled with the second diverter 160 and the first sub-source array 110. The lateral cable 150 can be directly coupled with the second diverter 160 and the first sub-source array 110. For example, the lateral cable 150 can be mounted on the second diverter 160. The lateral cable 150 can be indirectly coupled with the second diverter 160 and the first sub-source array 110. For example, the lateral cable 150 can be coupled with the first sub-source array 110 via a cable. The lateral cable 150 can be coupled with the second diverter 160 and the second sub-source array 115. The lateral cable 150 can be directly coupled with the second diverter 160 and the second sub-source array 115. For example, the lateral cable 150 can be mounted on the second diverter 160. The lateral cable 150 can be indirectly coupled with the second diverter 160 and the second sub-source array 115. For example, the lateral cable 150 can be coupled with the second sub-source array 115 via a cable. The lateral cable 150 can be coupled with the first diverter 155 and the second diverter 160. The lateral cable 150 can be coupled with the first sub-source array 110 and the second sub-source array 115.

The seismic survey system 100 can include a positioning cable 165. The positioning cable 165 can be coupled with the first diverter 155 and trailing from the vessel 170. The positioning cable 165 can be coupled with the vessel 170. The positioning cable 165 can be coupled with the lateral cable 150. The positioning cable 165 can be coupled with the first diverter 155. The positioning cable 165 can be directly coupled with the first diverter 155 and the vessel 170. For example, the positioning cable 165 can be mounted on the vessel 170. The positioning cable 165 can be mounted on the first diverter 155. The positioning cable 165 can be indirectly coupled with the first diverter 155 and the vessel 170. For example, the positioning cable 165 can be coupled with the vessel 170 via a cable. The positioning cable 165 can be coupled with the first diverter 155 via a cable. The positioning cable 165 can include a first diverter positioning cable. The positioning cable 165 can include a second diverter positioning cable.

The positioning cable 165 can be coupled with the second diverter 160. The positioning cable 165 can be coupled with the second diverter 160 and trailing from the vessel 170. The positioning cable 165 can be directly coupled with the second diverter 160 and the vessel 170. For example, the positioning cable 165 can be mounted on the vessel 170. The positioning cable 165 can be mounted on the second diverter 160. The positioning cable 165 can be indirectly coupled with the second diverter 160 and the vessel 170. For example, the positioning cable 165 can be coupled with the vessel 170 via a cable. The positioning cable 165 can be coupled with the second diverter 160 via a cable.

The seismic survey system 100 can include a power cable 180. The power cable 180 can be coupled with the first sub-source array 110 and trailing from the vessel 170. The power cable 180 can be coupled with the second sub-source array 115 and trailing from the vessel 170. The power cable

180 can be coupled with the float 185. The power cable 180 can be directly coupled with the float 185. For example, the power cable 180 can be mounted on the float 185. The power cable 180 can be indirectly coupled with the float 185. For example, the power cable 180 can be coupled with the float 185 via a cable. The power cable 180 can be coupled with the vessel 170. The power cable 180 can be directly coupled with the vessel 170. For example, the power cable 180 can be mounted on the vessel 170. The power cable 180 can be indirectly coupled with the vessel 170. For example, the power cable 180 can be coupled with the vessel 170 via a cable. The power cable 180 can transmit electrical power from the vessel 170 to the receiver array 130. The power cable 180 can transmit electrical power from the vessel 170 to the plurality of receivers 135. The seismic survey system 100 can include a plurality of power cables 180. For example, the seismic survey system 100 can include a first power cable, a second power cable, a third power cable, a fourth power cable, a fifth power cable, and a sixth power cable. The seismic survey system 100 can include more than six power cables. The seismic survey system 100 can include fewer than six power cables. The power cable 180 can be coupled to the plurality of receivers 135. For example, the power cable 180 can be coupled to the first subset of the plurality of receivers 135. The power cable 180 can be coupled to the second subset of the plurality of receivers 135. The power cable 180 can be coupled to the third subset of the plurality of receivers 135. The power cable 180 can be coupled to the fourth subset of the plurality of receivers 135. The power cable 180 can include a first sub-source array power cable. The power cable 180 can include a second sub-source array power cable.

The power cable 180 can include a first power cable. The power cable 180 coupled with the first sub-source array 110 can include the first power cable. The first power cable can be coupled with a float of the first sub-source array 110. The first power cable can be directly coupled with the float of the first sub-source array 110. For example, the first power cable can be mounted on the float of the first sub-source array 110. The first power cable can be indirectly coupled with the float of the first sub-source array 110. For example, the first power cable can be coupled with the float of the first sub-source array 110 via a cable. The first power cable can be coupled with the first float of the first sub-source array 110. The first power cable can be coupled with the second float of the first sub-source array 110. The first power cable can be coupled with the third float of the first sub-source array 110. The first power cable can be coupled with the first float of the second sub-source array 115. The first power cable can be coupled with the second float of the second sub-source array 115. The first power cable can be coupled with the third float of the second sub-source array 115.

The power cable 180 can include a second power cable. The power cable 180 coupled with the second sub-source array 115 can include the second power cable. The second power cable can be coupled with a float of the first sub-source array 110. The second power cable can be directly coupled with the float of the first sub-source array 110. For example, the second power cable can be mounted on the float of the first sub-source array 110. The second power cable can be indirectly coupled with the float of the first sub-source array 110. For example, the second power cable can be coupled with the float of the first sub-source array 110 via a cable. The second power cable can be coupled with the first float of the first sub-source array 110. The second power cable can be coupled with the second float of the first sub-source array 110. The second power cable can be coupled with the third float of the first sub-source array 110. The second power cable can be coupled with the first float of the second sub-source array 115. The second power cable can be coupled with the second float of the second sub-source array 115. The second power cable can be coupled with the third float of the second sub-source array 115.

The power cable 180 can include a third power cable. The power cable 180 coupled with the second sub-source array 115 can include the third power cable. The third power cable can be coupled with a float of the first sub-source array 110. The third power cable can be directly coupled with the float of the first sub-source array 110. For example, the third power cable can be mounted on the float of the first sub-source array 110. The third power cable can be indirectly coupled with the float of the first sub-source array 110. For example, the third power cable can be coupled with the float of the first sub-source array 110 via a cable. The third power cable can be coupled with the first float of the first sub-source array 110. The third power cable can be coupled with the second float of the first sub-source array 110. The third power cable can be coupled with the third float of the first sub-source array 110. The third power cable can be coupled with the first float of the second sub-source array 115. The third power cable can be coupled with the second float of the second sub-source array 115. The third power cable can be coupled with the third float of the second sub-source array 115.

The power cable 180 can include a third power cable. The power cable 180 coupled with the second sub-source array 115 can include the third power cable. The third power cable can be coupled with a float of the first sub-source array 110. The third power cable can be directly coupled with the float of the first sub-source array 110. For example, the third power cable can be mounted on the float of the first sub-source array 110. The third power cable can be indirectly coupled with the float of the first sub-source array 110. For example, the third power cable can be coupled with the float of the first sub-source array 110 via a cable. The third power cable can be coupled with the first float of the first sub-source array 110. The third power cable can be coupled with the second float of the first sub-source array 110. The third power cable can be coupled with the third float of the first sub-source array 110. The third power cable can be coupled with the first float of the second sub-source array 115. The third power cable can be coupled with the second float of the second sub-source array 115. The third power cable can be coupled with the third float of the second sub-source array 115.

The power cable 180 can include a fourth power cable. The power cable 180 coupled with the second sub-source array 115 can include the fourth power cable. The fourth power cable can be coupled with a float of the first sub-source array 110. The fourth power cable can be directly coupled with the float of the first sub-source array 110. For example, the fourth power cable can be mounted on the float of the first sub-source array 110. The fourth power cable can be indirectly coupled with the float of the first sub-source array 110. For example, the fourth power cable can be coupled with the float of the first sub-source array 110 via a cable. The fourth power cable can be coupled with the first float of the first sub-source array 110. The fourth power cable can be coupled with the second float of the first sub-source array 110. The fourth power cable can be coupled with the third float of the first sub-source array 110. The fourth power cable can be coupled with the first float of the second sub-source array 115. The fourth power cable can be coupled with the second float of the second sub-source array 115. The fourth power cable can be coupled with the third float of the second sub-source array 115.

The power cable 180 can include a fifth power cable. The power cable 180 coupled with the second sub-source array 115 can include the fifth power cable. The fifth power cable can be coupled with a float of the first sub-source array 110. The fifth power cable can be directly coupled with the float of the first sub-source array 110. For example, the fifth power cable can be mounted on the float of the first sub-source array 110. The fifth power cable can be indirectly coupled with the float of the first sub-source array 110. For example, the fifth power cable can be coupled with the float of the first sub-source array 110 via a cable. The fifth power cable can be coupled with the first float of the first sub-source array 110. The fifth power cable can be coupled with the second float of the first sub-source array 110. The fifth power cable can be coupled with the third float of the first sub-source array 110. The fifth power cable can be coupled with the first float of the second sub-source array 115. The fifth power cable can be coupled with the second float of the second sub-source array 115. The fifth power cable can be coupled with the third float of the second sub-source array 115.

The power cable 180 can include a sixth power cable. The power cable 180 coupled with the second sub-source array 115 can include the sixth power cable. The sixth power cable can be coupled with a float of the first sub-source array 110. The sixth power cable can be directly coupled with the float of the first sub-source array 110. For example, the sixth power cable can be mounted on the float of the first sub-source array 110. The sixth power cable can be indirectly coupled with the float of the first sub-source array 110. For example, the sixth power cable can be coupled with the float of the first sub-source array 110 via a cable. The sixth power cable can be coupled with the first float of the first sub-source array 110. The sixth power cable can be coupled with the second float of the first sub-source array 110. The sixth power cable can be coupled with the third float of the first sub-source array 110. The sixth power cable can be coupled with the first float of the second sub-source array 115. The sixth power cable can be coupled with the second float of the second sub-source array 115. The sixth power cable can be coupled with the third float of the second sub-source array 115.

The seismic survey system 100 can include a seismic data acquisition unit array 190. A body of water 10 having a surface 12 and a seabed 14 is depicted. The seismic data acquisition unit array 190 can include a plurality of seismic data acquisition units 195. The plurality of seismic data acquisition units 195 can include individual sensor units. The individual sensor units can include ocean bottom seismometers. The individual sensor units can include radio units. The individual sensor units can include seafloor seismic recorders. The individual sensor units can include one or more geophones. The individual sensor units can include one or more hydrophone sensors. The individual sensor units can include a continuously recording seismometer unit. The individual sensor units can include a self-contained wireless seismometer unit. The individual sensor units can include can include a self-contained seismometer unit. The individual sensor units can include a tilt meter. The individual sensor units can include a compass. The individual sensor units can be mechanically gimballed. The individual sensor units can include a geophone to mechanically vibrate the individual sensor unit to gauge the degree of coupling between the individual sensor unit and the earth. The individual sensor units can utilize multiple geophones angularly oriented to one another in order to redundantly measure seismic activity in a particular plane. The individual sensor units can include a radio frequency identification (RFID) tag or similar identification indicia to permit tracking of the individual sensor units. The individual sensor units can include a GPS transducer which permits the unit's location to be determined.

The seismic data acquisition unit array 190 can include a distributed acoustic sensing (DAS) system. For example, the seismic data acquisition unit array 190 can include fiber optic cables. When an acoustic signal hits the fiber optic cables, the light within the fiber optic cables is impacted. Therefore, seismic data can be obtained from the distrusted acoustic sensing system. The seismic survey system 100 can provide a data set in addition to DAS data to expand the area imaged beyond the geographical limitations of the DAS survey area. The seismic data acquisition unit array 190 can include a vertical seismic profile (VSP) system. For example, the seismic data acquisition unit array 190 can include seismic sensors, hydrophones, geophones, or accelerometers located in a borehole to record reflected seismic energy originating from a seismic source. The seismic survey system 100 can provide a data set in addition to VSP data to expand the area imaged beyond the geographical limitations of the VSP survey area.

The plurality of seismic data acquisition units 195 can be disposed on a seabed 14. Individual seismic data acquisition units can be disposed on a seabed 14 in a regular pattern. For example, the individual seismic data acquisition units of the plurality of seismic data acquisition units 195 can be disposed on the seabed 14 in a grid pattern. The individual seismic data acquisition units of the plurality of seismic data acquisition units 195 can be disposed on the seabed 14 along a line. Each seismic data acquisition unit of the plurality of seismic data acquisition units 195 can be spaced a threshold distance 197 apart. The threshold distance 197 can be greater than or equal to 50 meters (e.g., 50 meters, 75 meters, 100 meters, 125 meters, 150 meters, 175 meters, 200 meters, 250 meters, 300 meters, etc.). The threshold distance 197 can be less than 50 meters. The plurality of seismic data acquisition units 195 can be separated by a threshold distance 197 of greater than 200 meters. For example, a sparse node survey can have seismic data acquisition units separated by a threshold distance 197 of greater than 200 meters.

Figure 2:
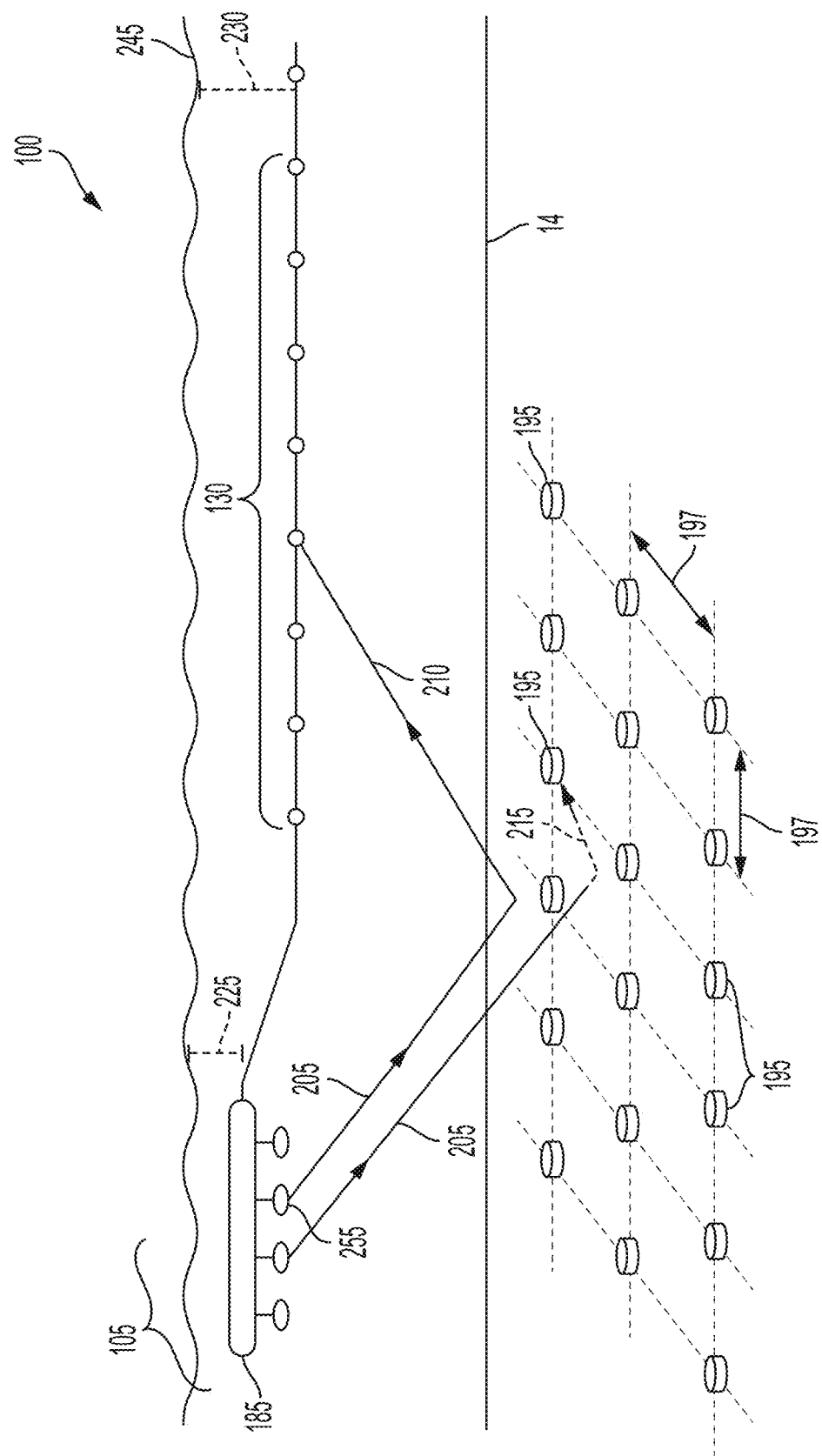
FIG. 2 illustrates a seismic survey system according to an example implementation.

FIG. 2 illustrates an example seismic survey system 100. The seismic survey system 100 can include a source array 105. The source array 105 can include a first sub-source array 110. The first sub-source array 110 can include a float 185. The first sub-source array 110 can include a first float of the first sub-source array 110. The first float of the first sub-source array 110 can include an air gun 255. The source array 105 can generate an acoustic signal. The acoustic signal generated by source array 105 can be a source shot 205. The air gun 255 can generate an acoustic signal. The acoustic signal generated by air gun 255 can be a source shot 205. The source array 105 can be disposed at a first depth 225 of a body of water. The source array 105 can be disposed at a first depth 225 below a sea surface 245. The first depth 225 can be between 5 meters and 15 meters below the sea surface 245. The first depth 225 can be less than 5 meters below the sea surface 245. The first depth 225 can be greater than 15 meters below the sea surface 245.

The seismic survey system 100 can include a receiver array 130. The receiver array 130 can be disposed at a second depth 230 of the body of water. The receiver array 130 can be disposed at a second depth 230 below the sea surface 245. The second depth 230 can be between 0.5 meters and 20 meters below the sea surface 245. The second depth 230 can be shallower than the first depth 225. The second depth 230 can be deeper than the first depth 225. The second depth 230 can be less than 0.5 meters below the sea surface 245. The second depth 230 can be greater than 20 meters below the sea surface 245.

The receiver array 130 can receive receiver array reflection data 210 generated by the acoustic signal. The source shot 205 can reflect off a seabed 14. The source shot 205 can reflect off an object in the seabed 14. The source shot 205 can reflect off a feature in the seabed 14. Reflection data from reflected off the seabed 14 from the source shot 205 can be receiver array reflection data 210. The receiver array reflection data 210 can be refection data generated by the acoustic signal from the source shot 205. The receiver array 130 can receive the receiver array reflection data 210.

The seismic data acquisition unit array 190 can receive receiver array reflection data 210 generated by the acoustic signal. The source shot 205 can reflect off a seabed 14. The source shot 205 can reflect off an object in the seabed 14. The source shot 205 can reflect off a feature in the seabed 14. Reflection data from reflected off the seabed 14 from the source shot 205 can be seismic data acquisition unit array reflection data 215. The seismic data acquisition unit array reflection data 215 can be refection data generated by the acoustic signal from the source shot 205. The receiver array 130 can receive the seismic data acquisition unit array reflection data 215.

The seismic survey system 100 can include a data processing system 1000. The data processing system 1000 can have one or more processors 1010. The data processing system 1000 can initiate a source shot 205 of the first sub-source array 110. The source shot 205 of the first sub-source array 110 can reflect off a seabed 14. The source shot 205 of the first sub-source array 110 can reflect off an object in the seabed 14. The source shot 205 of the first sub-source array 110 can reflect off a feature in the seabed 14. Reflection data from reflected off the seabed 14 from the source shot 205 of the first sub-source array 110 can be receiver array reflection data 210. The receiver array reflection data 210 can be refection data generated by the acoustic signal from the source shot 205 of the first sub-source array 110. The receiver array 130 can receive the receiver array reflection data 210. Reflection data from reflected off the seabed 14 from the source shot 205 of the first sub-source array 110 can be seismic data acquisition unit array reflection data 215. The seismic data acquisition unit array reflection data 215 can be refection data generated by the acoustic signal from the source shot 205 of the first sub-source array 110. The receiver array 130 can receive the seismic data acquisition unit array reflection data 215.

The data processing system 1000 can initiate a source shot 205 of the second sub-source array 115. The source shot 205 of the second sub-source array 115 can reflect off a seabed 14. The source shot 205 of the second sub-source array 115 can reflect off an object in the seabed 14. The source shot 205 of the second sub-source array 115 can reflect off a feature in the seabed 14. Reflection data from reflected off the seabed 14 from the source shot 205 of the second sub-source array 115 can be receiver array reflection data 210. The receiver array reflection data 210 can be refection data generated by the acoustic signal from the source shot 205 of the second sub-source array 115. The receiver array 130 can receive the receiver array reflection data 210. Reflection data from reflected off the seabed 14 from the source shot 205 of the second sub-source array 115 can be seismic data acquisition unit array reflection data 215. The seismic data acquisition unit array reflection data 215 can be refection data generated by the acoustic signal from the source shot 205 of the second sub-source array 115. The receiver array 130 can receive the seismic data acquisition unit array reflection data 215.

Figure 3:
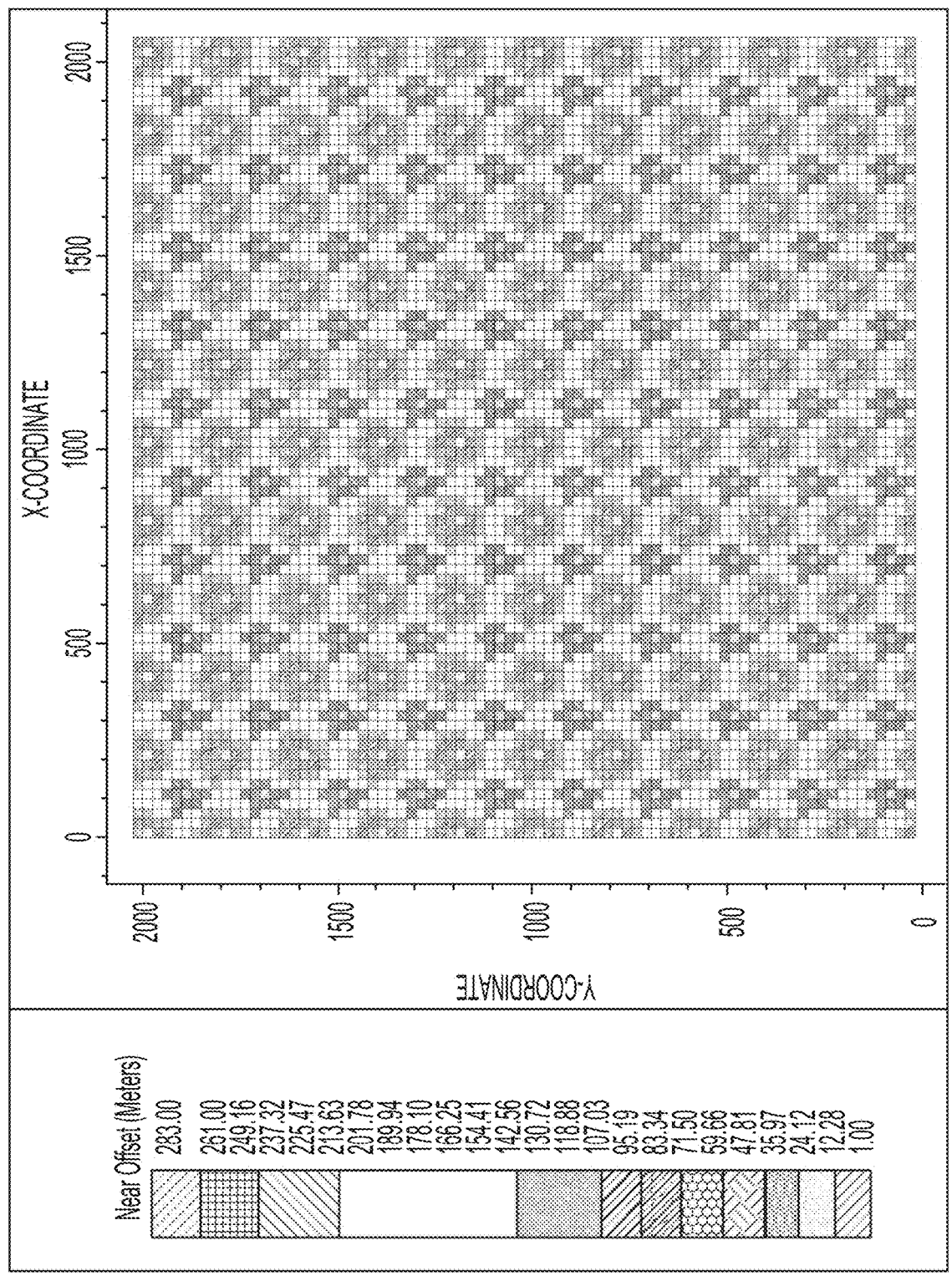
FIG. 3 illustrates near offset data for a plurality of seismic data acquisition units according to an example implementation.

FIG. 3 illustrates an example of near offset data for a plurality of seismic data acquisition units. The near offsets are shown in meters. The data show a range of near offsets of approximately 1 meter to 280 meters. The near offset data can be obtained by a seismic data acquisition unit array 190. For example, the near offset data can include reflection data generated by an acoustic signal. A plurality of seismic data acquisition units 195 can receive the near offset data. The plurality of seismic data acquisition units 195 can receive the near offset data and a processor can generate the image shown in FIG. 3. The processor can provide the near offset data to a screen or display. The processor can manipulate the near offset data and output the near offset data to a screen or display.

Figure 4:
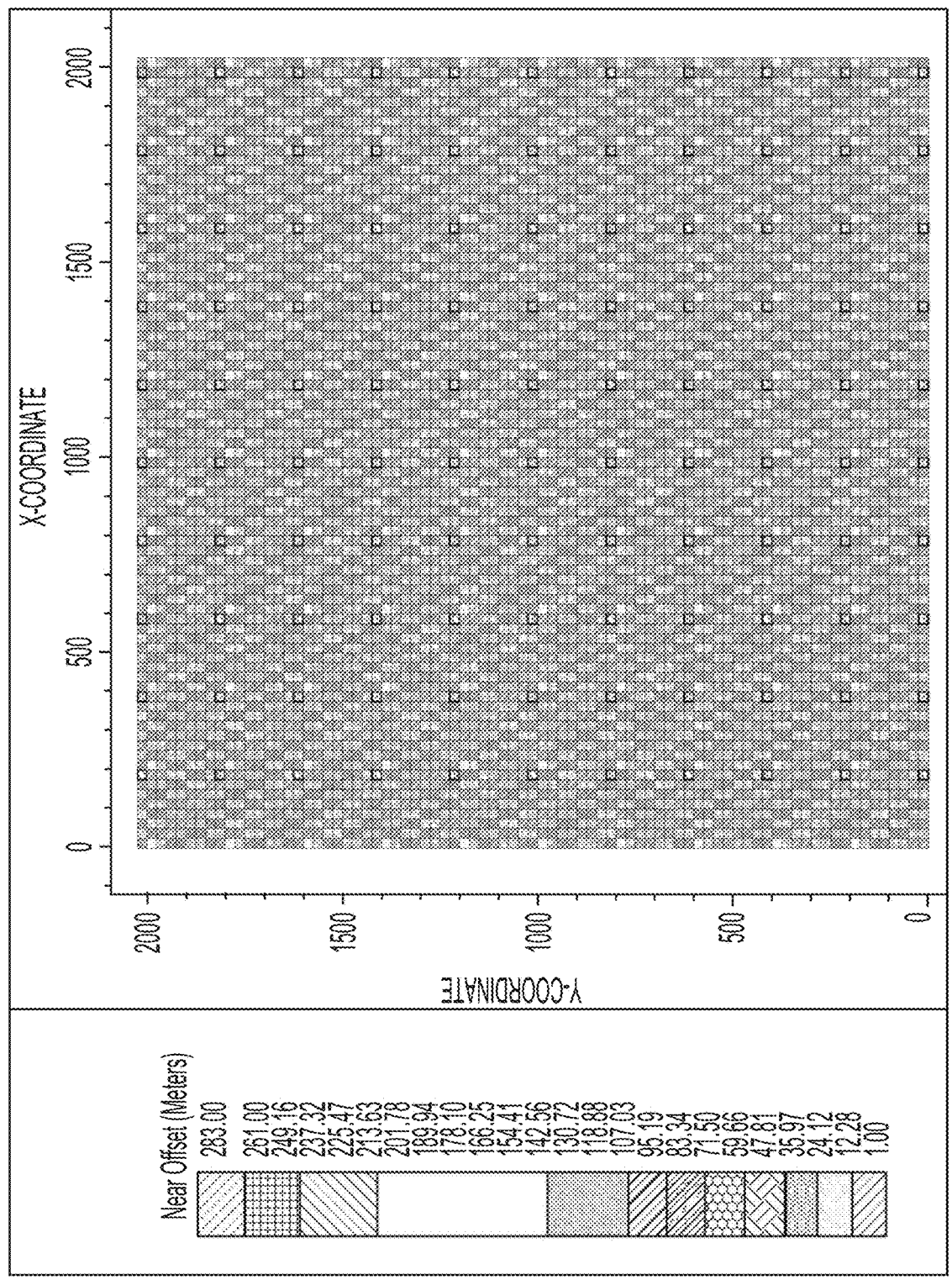
FIG. 4 illustrates near offset data for a plurality of receivers coupled with streamers and a plurality of seismic data acquisition units according to an example implementation.

FIG. 4 illustrates an example of near offset data for a plurality of receivers coupled with streamers and a plurality of seismic data acquisition units. The near offsets are shown in meters. The data show a range of near offsets of approximately 1 meter to 70 meters. Including data from both the plurality of receivers coupled streamers and the plurality of seismic data acquisition units reduces the range of near offsets as compared with data from only the plurality of seismic data acquisition units. The near offset data can be obtained by the systems and methods described herein. For example, the near offset data can be obtained by the seismic survey system 100. The near offset data can include reflection data generated by an acoustic signal. The near offset data can be a combination of data received by the receiver array 130 and the seismic data acquisition unit array 190. The plurality of receivers 135 and the plurality of seismic data acquisition units 195 can receive the near offset data and a processor can generate the image shown in FIG. 4. The processor can provide the near offset data to a screen or display. The processor can manipulate the near offset data and output the near offset data to a screen or display.

Figure 5:
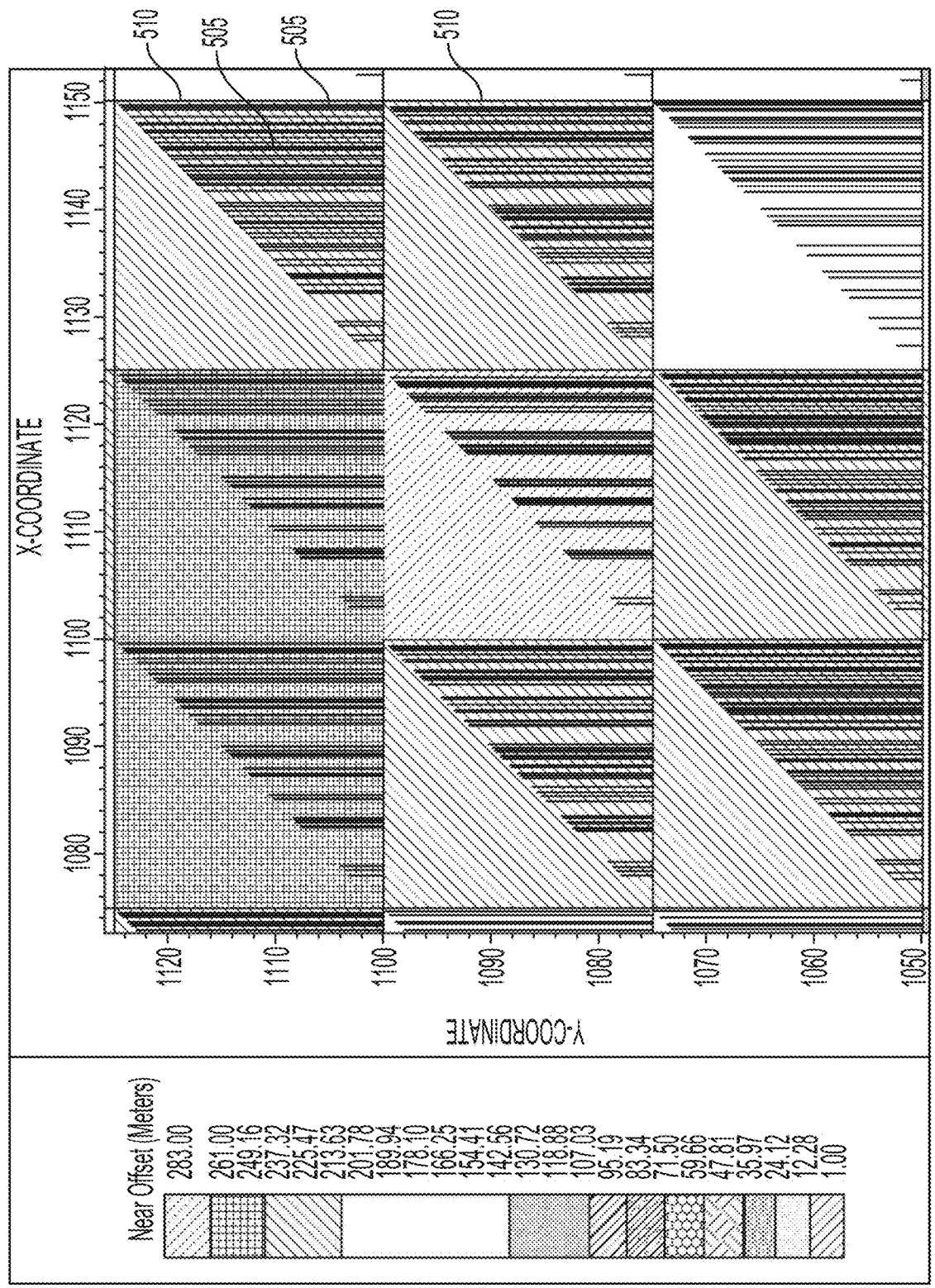
FIG. 5 illustrates offset distributions for a plurality of seismic data acquisition units according to an example implementation.

FIG. 5 illustrates an example of offset distributions for a plurality of seismic data acquisition units. The near offsets are shown in meters. The data show a range of near offset distribution of approximately 140 meters to 270 meters. The lines 505 represent the number of samples in each bin 510. The near offset distributions can be obtained by a seismic data acquisition unit array 190. For example, the near offset distributions can be generated by obtaining near offset data. The near offset data can include reflection data generated by an acoustic signal. A plurality of seismic data acquisition units 195 can receive the near offset data. The plurality of seismic data acquisition units 195 can receive the near offset data and a processor can generate the image shown in FIG. 5. The processor can provide the near offset data to a screen or display. The processor can manipulate the near offset data and output the near offset data to a screen or display.

Figure 6:
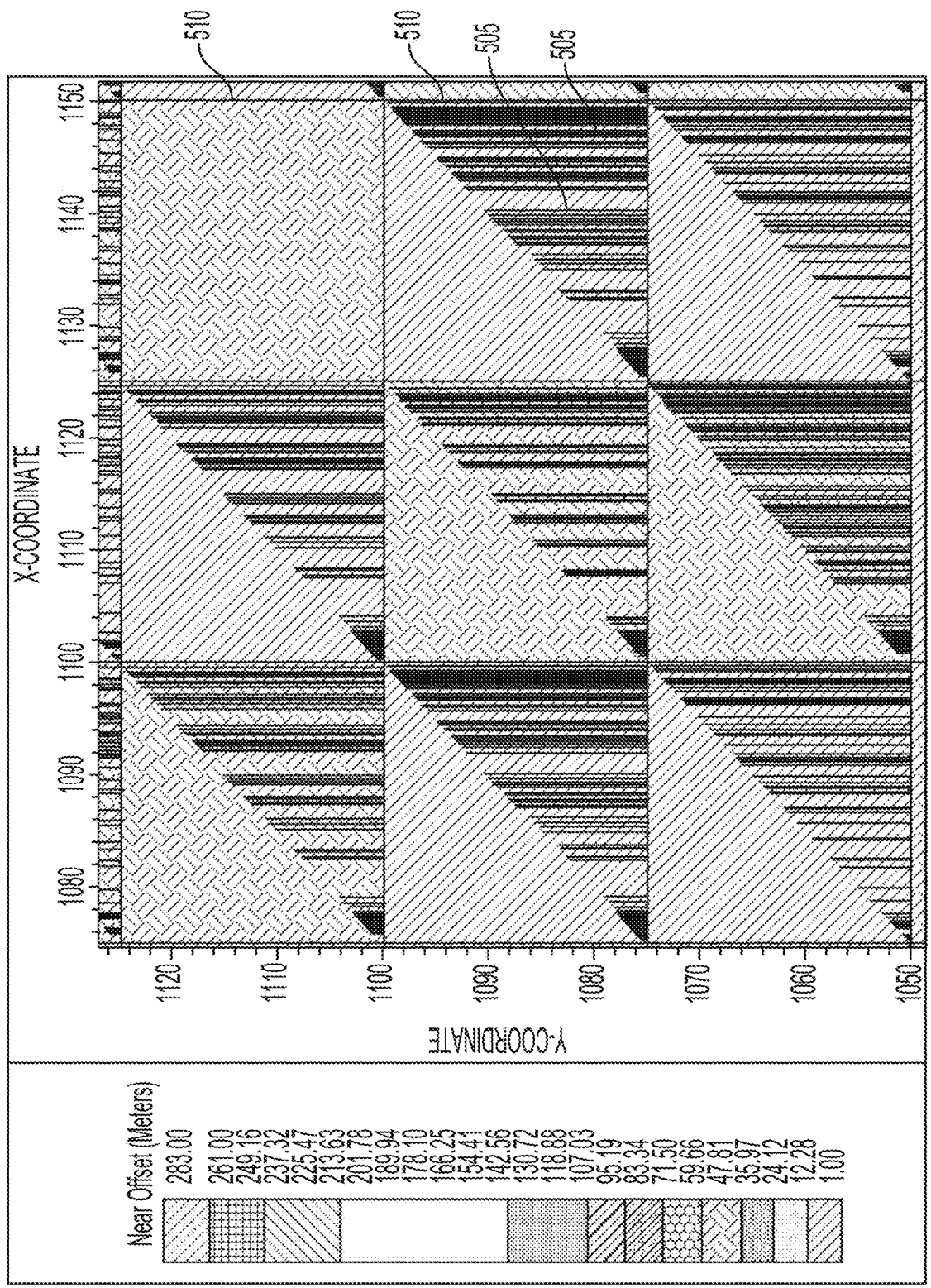
FIG. 6 illustrates offset distributions for a plurality of streamers coupled with streamers and a plurality of seismic data acquisition units according to an example implementation.

FIG. 6 illustrates an example of offset distributions for a plurality of streamers coupled with streamers and a plurality of seismic data acquisition units. The near offsets are shown in meters. The data show a range of near offset distribution of approximately 1 meter to 50 meters. The lines 505 represent the number of samples in each bin 510. Including data from both the plurality of receivers coupled streamers and the plurality of seismic data acquisition units reduces the range of near offset distribution as compared with data from only the plurality of seismic data acquisition units. For example, the near offset distributions can be generated by obtaining near offset data. The near offset data can be obtained by the systems and methods described herein. For example, the near offset data can be obtained by the seismic survey system 100. The near offset data can include reflection data generated by an acoustic signal. The near offset data can be a combination of data received by the receiver array 130 and the seismic data acquisition unit array 190. The plurality of receivers 135 and the plurality of seismic data acquisition units 195 can receive the near offset data and a processor can generate the image shown in FIG. 6. The processor can provide the near offset data to a screen or display. The processor can manipulate the near offset data and output the near offset data to a screen or display.

FIG. 7 illustrates data from a plurality of seismic data acquisition units and near offset data according to an example implementation. Image 705 depicts data from ocean bottom seismic data acquisition units. Image 705 can be generated by the plurality of seismic data acquisition units 195. The plurality of seismic data acquisition units 195 can receive reflection data and a processor can generate image 705. The reflection data can include reflection data generated by an acoustic signal. The processor can manipulate the reflection data and output the reflection data to a screen or display.

Image 710 depicts data from ocean bottom seismic data acquisition units and receivers coupled to a source array. Image 710 can be generated by the plurality of receivers 135 and the plurality of seismic data acquisition units 195. The plurality of receivers 135 and the plurality of seismic data acquisition units 195 can receive reflection data and a processor can generate image 710. The processor can manipulate the reflection data and output the reflection data to a screen or display. The reflection data used to generate image 710 can be obtained by the systems and methods described herein. For example, the reflection data can be obtained by the seismic survey system 100. The reflection data can include reflection data generated by an acoustic signal. The reflection data can be a combination of data received by the receiver array 130 and the seismic data acquisition unit array 190. The processor can provide the reflection data to a screen or display. The processor can manipulate the reflection data and output the reflection data to a screen or display.

Figure 8:
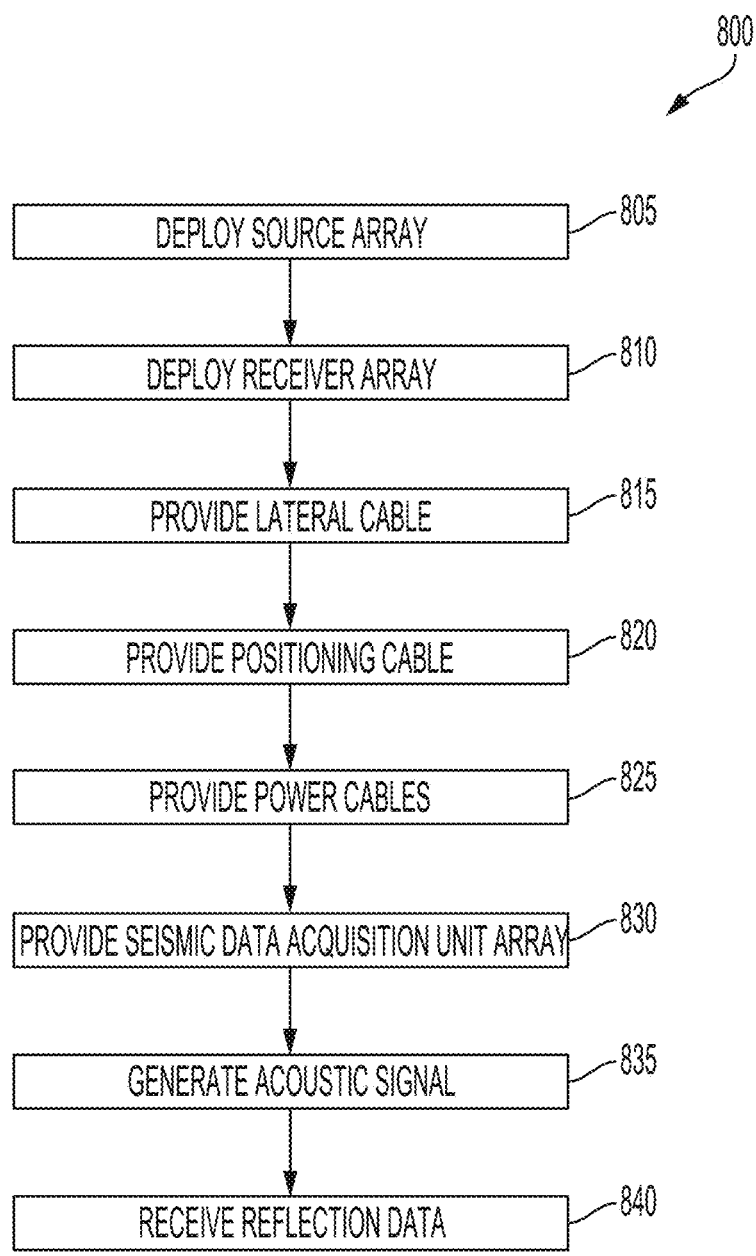
FIG. 8 illustrates a method of seismic surveying according to an example implementation.

FIG. 8 illustrates a method of seismic surveying according to an embodiment. In brief summary, the method 800 can include deploying a source array (BLOCK 805). The method 800 can include deploying a receiver array (BLOCK 810). The method 800 can include providing a lateral cable (BLOCK 815). The method 800 can include providing a positioning cable (BLOCK 820). The method 800 can include providing power cables (BLOCK 825). The method 800 can include providing a seismic data acquisition unit array (BLOCK 830). The method 800 can include generating an acoustic signal (BLOCK 835). The method 800 can include receiving reflection data (BLOCK 840).

The method 800 can include deploying a source array (BLOCK 805). The source array can include a streamer coupled with a first sub-source array. The source array can include a streamer coupled with a second sub-source array. The method can include towing, by the vessel, the source array and the receiver array in a tow direction. The tow direction can include a direction that the vessel is towed. The method can include disposing the source array at a first depth of a body of water. The first depth can be between 5 meters and 15 meters below the sea surface. The first depth can be less than 5 meters below the sea surface. The first depth can be greater than 15 meters below the sea surface.

The method 800 can include deploying a receiver array (BLOCK 810). The receiver array can include a plurality of receivers. A first subset of the plurality of receivers can couple with the streamer coupled with the first sub-source array. A second subset of the plurality of receivers can couple with the streamer coupled with the second sub-source array. The method can include disposing the receiver array at a second depth of the body of water. The second depth can be deeper than the first depth. The second depth can be shallower than the first depth. The second depth can be the same as the first depth. The receiver array can be disposed at a second depth of the body of water. The receiver array can be disposed at a second depth below the sea surface. The second depth can be between 0.5 meters and 20 meters below the sea surface. The second depth 20 can be shallower than the first depth. The second depth can be deeper than the first depth. The second depth can be less than 0.5 meters below the sea surface. The second depth can be greater than 20 meters below the sea surface.

The method 800 can include providing a lateral cable (BLOCK 815). The lateral cable can couple with at least one of a first diverter or a second diverter and at least one of the first sub-source array or the second sub-source array. The lateral cable can be coupled with at least one of a first diverter or a second diverter and at least one of the first sub-source array or the second sub-source array. For example, the lateral cable can be coupled with the first diverter and the first sub-source array. The lateral cable can be directly coupled with the first diverter and the first sub-source array. For example, the lateral cable can be mounted on the first diverter. The lateral cable can be indirectly coupled with the first diverter and the first sub-source array. For example, the lateral cable can be coupled with the first sub-source array via a cable. The lateral cable can be coupled with the first diverter and the second sub-source array. The lateral cable can be directly coupled with the first diverter and the second sub-source array. For example, the lateral cable can be mounted on the first diverter. The lateral cable can be indirectly coupled with the first diverter and the second sub-source array. For example, the lateral cable can be coupled with the second sub-source array via a cable.

The lateral cable can be coupled with the second diverter and the first sub-source array. The lateral cable can be directly coupled with the second diverter and the first sub-source array. For example, the lateral cable can be mounted on the second diverter. The lateral cable can be indirectly coupled with the second diverter and the first sub-source array. For example, the lateral cable can be coupled with the first sub-source array via a cable. The lateral cable can be coupled with the second diverter and the second sub-source array. The lateral cable can be directly coupled with the second diverter and the second sub-source array. For example, the lateral cable can be mounted on the second diverter. The lateral cable can be indirectly coupled with the second diverter and the second sub-source array. For example, the lateral cable can be coupled with the second sub-source array via a cable. The lateral cable can be coupled with the first diverter and the second diverter. The lateral cable can be coupled with the first sub-source array and the second sub-source array.

The method 800 can include providing a positioning cable (BLOCK 820). The positioning cable can couple with the first diverter and trail from a vessel. The positioning cable can couple with the second diverter and trail from the vessel. The seismic survey system can include a positioning cable. The positioning cable can be coupled with the first diverter and trailing from the vessel. The positioning cable can be coupled with the vessel. The positioning cable can be coupled with the lateral cable. The positioning cable can be coupled with the first diverter. The positioning cable can be directly coupled with the first diverter and the vessel. For example, the positioning cable can be mounted on the vessel. The positioning cable can be mounted on the first diverter. The positioning cable can be indirectly coupled with the first diverter and the vessel. For example, the positioning cable can be coupled with the vessel via a cable. The positioning cable can be coupled with the first diverter via a cable.

The positioning cable can be coupled with the second diverter. The positioning cable can be coupled with the second diverter and trailing from the vessel. The positioning cable can be directly coupled with the second diverter and the vessel. For example, the positioning cable can be mounted on the vessel. The positioning cable can be mounted on the second diverter. The positioning cable can be indirectly coupled with the second diverter and the vessel. For example, the positioning cable can be coupled with the vessel via a cable. The positioning cable can be coupled with the second diverter via a cable.

The method 800 can include providing power cables (BLOCK 825). The plurality of power cables can couple with at least one of the first sub-source array or the second sub-source array. The plurality of power cables can trail from the vessel. The seismic survey system can include a power cable. The power cable can be coupled with the first sub-source array and trailing from the vessel. The power cable can be coupled with the second sub-source array and trailing from the vessel. The power cable can be coupled with the float. The power cable can be directly coupled with the float. For example, the power cable can be mounted on the float. The power cable can be indirectly coupled with the float. For example, the power cable can be coupled with the float via a cable. The power cable can be coupled with the vessel. The power cable can be directly coupled with the vessel. For example, the power cable can be mounted on the vessel. The power cable can be indirectly coupled with the vessel. For example, the power cable can be coupled with the vessel via a cable. The power cable can transmit electrical power from the vessel to the receiver array. The power cable can transmit electrical power from the vessel to the plurality of receivers. The seismic survey system can include a plurality of power cables. For example, the seismic survey system can include a first power cable, a second power cable, a third power cable, a fourth power cable, a fifth power cable, and a sixth power cable. The seismic survey system can include more than six power cables. The seismic survey system can include fewer than six power cables. The power cable can be coupled to the plurality of receivers. For example, the power cable can be coupled to the first subset of the plurality of receivers. The power cable can be coupled to the second subset of the plurality of receivers. The power cable can be coupled to the third subset of the plurality of receivers. The power cable can be coupled to the fourth subset of the plurality of receivers.

The method 800 can include providing a seismic data acquisition unit array (BLOCK 830). The seismic data acquisition unit array can include a plurality of seismic data acquisition units disposed on a seabed. Each seismic data acquisition unit of the plurality of seismic data acquisition units can be spaced a threshold distance apart. Individual seismic data acquisition units can be disposed on a seabed in a regular pattern. For example, the individual seismic data acquisition units of the plurality of seismic data acquisition units can be disposed on the seabed in a grid pattern. The individual seismic data acquisition units of the plurality of seismic data acquisition units can be disposed on the seabed along a line. Each seismic data acquisition unit of the plurality of seismic data acquisition units can be spaced a threshold distance apart. The threshold distance can be greater than or equal to 50 meters (e.g., 50 meters, 75 meters, 100 meters, 125 meters, 150 meters, 175 meters, 200 meters, 250 meters, 300 meters, etc.). The threshold distance can be less than 50 meters.

The seismic survey system can include a seismic data acquisition unit array. A body of water having a surface and a seabed is depicted. The seismic data acquisition unit array can include a plurality of seismic data acquisition units. The plurality of seismic data acquisition units can include individual sensor units. The individual sensor units can include ocean bottom seismometers. The individual sensor units can include radio units. The individual sensor units can include seafloor seismic recorders. The individual sensor units can include one or more geophones. The individual sensor units can include one or more hydrophone sensors. The individual sensor units can include a continuously recording seismometer unit. The individual sensor units can include a self-contained wireless seismometer unit. The individual sensor units can include can include a self-contained seismometer unit. The individual sensor units can include a tilt meter. The individual sensor units can include a compass. The individual sensor units can be mechanically gimballed. The individual sensor units can include a geophone to mechanically vibrate the individual sensor unit to gauge the degree of coupling between the individual sensor unit and the earth. The individual sensor units can utilize multiple geophones angularly oriented to one another in order to redundantly measure seismic activity in a particular plane. The individual sensor units can include a radio frequency identification (RFID) tag or similar identification indicia to permit tracking of the individual sensor units. The individual sensor units can include a GPS transducer which permits the unit's location to be determined.

The method 800 can include generating an acoustic signal (BLOCK 835). The method can include generating, by the source array, an acoustic signal. The acoustic signal generated by the source array can be a source shot. The method can include initiating, by a data processing system, a source shot of the first sub-source array. The method can include initiating, by the data processing system, a source shot of the second sub-source array. The source shot of the first sub-source array can occur at the same time as the source shot of the second sub-source array. The source shot of the first sub-source array can occur at a different time as the source shot of the second sub-source array. The source shot of the first sub-source array can occur after the source shot of the second sub-source array. The source shot of the first sub-source array can occur before the source shot of the second sub-source array.

The method 800 can include receiving reflection data (BLOCK 840). The method can include receiving, by the receiver array, reflection data generated by the acoustic signal. The receiver array can receive receiver array reflection data. Reflection data from reflected off the seabed from the source shot can be receiver array reflection data. The receiver array reflection data 210 can be refection data generated by the acoustic signal from the source shot. The receiver array can receive the receiver array reflection data. The method can include receiving, by the seismic data acquisition unit array, reflection data generated by the acoustic signal. The seismic data acquisition unit array can receive seismic data acquisition unit array reflection data. Reflection data from reflected off the seabed from the source shot can be seismic data acquisition unit array reflection data. The seismic data acquisition unit array reflection data can be refection data generated by the acoustic signal from the source shot. The receiver array can receive the seismic data acquisition unit array reflection data.

Figure 9:
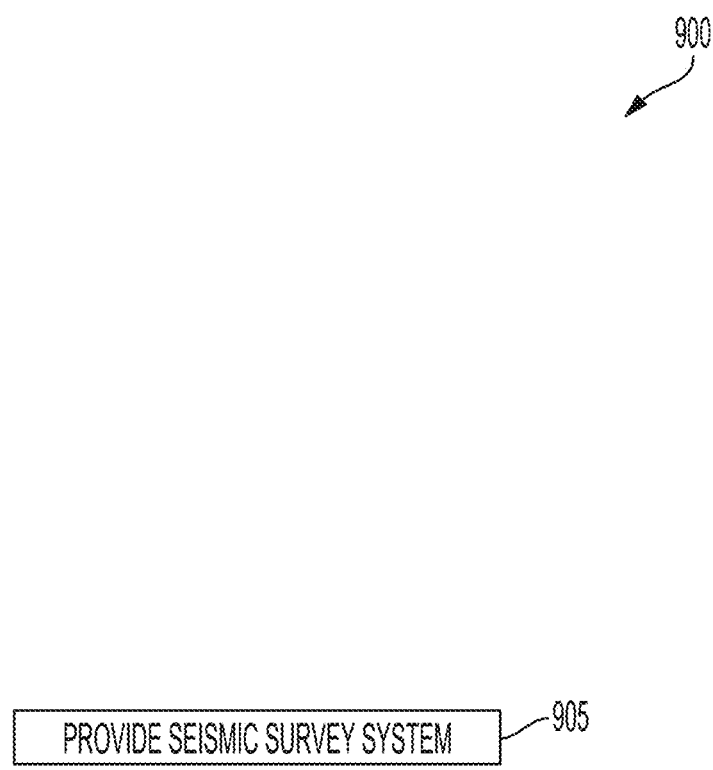
FIG. 9 illustrates a method of seismic surveying according to an example implementation.

FIG. 9 illustrates a method of seismic surveying according to an embodiment. The method 900 can include providing a seismic survey system (BLOCK 905). The seismic survey system can include a source array comprising a first sub-source array and a second sub-source array. The seismic survey system can include a streamer coupled with the first sub-source array. The seismic survey system can include a streamer coupled with the second sub-source array. The seismic survey system can include a receiver array comprising a plurality of receivers. A first subset of the plurality of receivers can be coupled with the streamer coupled with the first sub-source array. A second subset of the plurality of receivers can be coupled with the streamer coupled with the second sub-source array. The seismic survey system can include a lateral cable coupled with at least one of a first diverter or a second diverter and at least one of the first sub-source array or the second sub-source array. The seismic survey system can include a positioning cable coupled with the first diverter and trailing from a vessel. The seismic survey system can include a positioning cable coupled with the second diverter and trailing from the vessel. The seismic survey system can include a power cable coupled with the first sub-source array and trailing from the vessel. The seismic survey system can include a power cable coupled with the second sub-source array and trailing from the vessel. The seismic survey system can include a seismic data acquisition unit array including a plurality of seismic data acquisition units disposed on a seabed, each seismic data acquisition unit of the plurality of seismic data acquisition units spaced a threshold distance apart.

Figure 10:
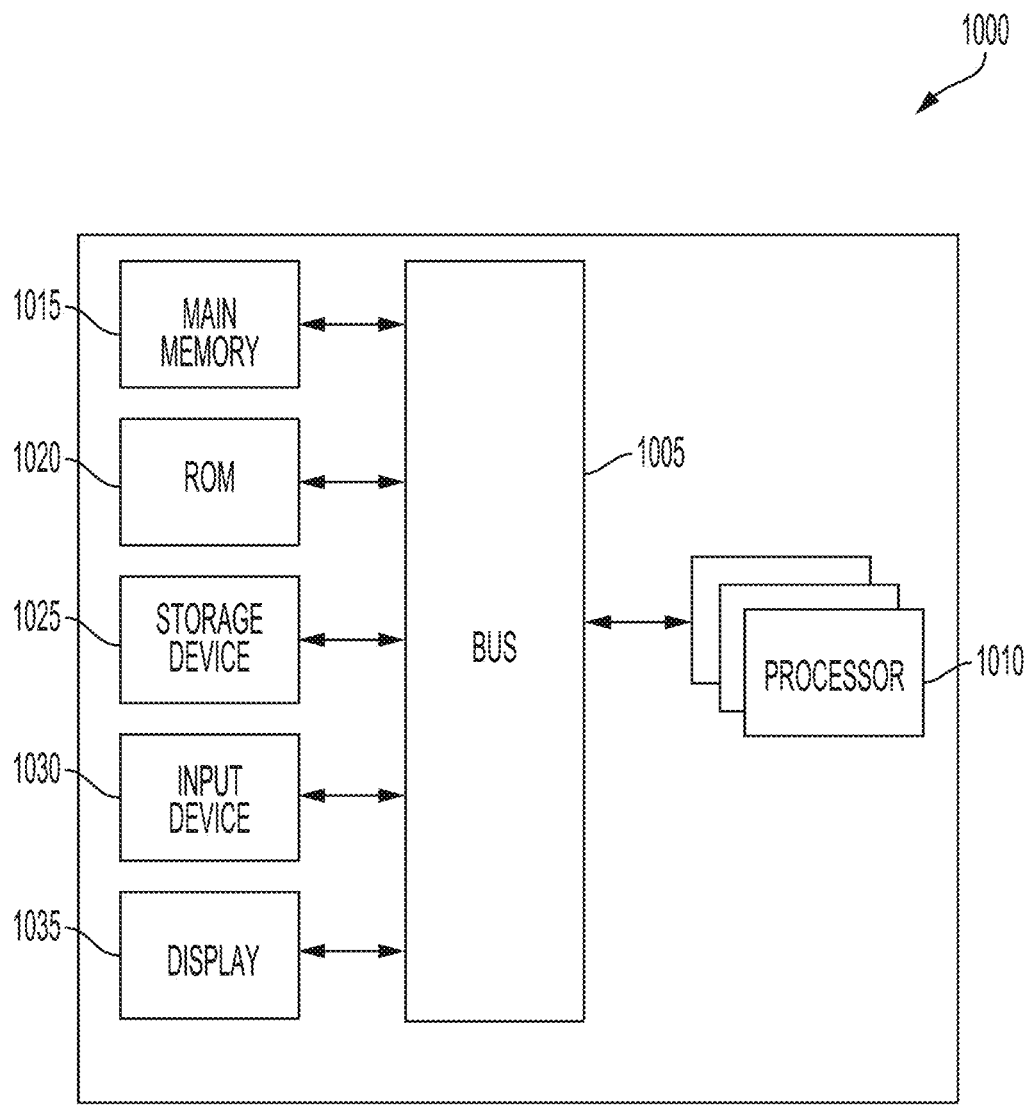
FIG. 10 depicts a block diagram of an architecture for a computing system employed to implement various elements of the systems or components depicted in FIGS. 1-9.

FIG. 10 depicts a block diagram of an architecture for a computing system employed to implement various elements of the systems or components depicted in FIGS. 1-9. FIG. 10 is a block diagram of a data processing system including a computer system 1000 in accordance with an embodiment. The data processing system, computer system or computing device 1000 can be used to implement one or more component configured to filter, translate, transform, generate, analyze, or otherwise process the data or signals depicted in FIGS. 1-9. The computing system 1000 includes a bus 1005 or other communication component for communicating information and a processor 1010 or processing circuit coupled to the bus 1005 for processing information. The computing system 1000 can also include one or more processors 1010 or processing circuits coupled to the bus for processing information. The computing system 1000 also includes main memory 1015, such as a random access memory (RAM) or other dynamic storage device, coupled to the bus 1005 for storing information, and instructions to be executed by the processor 1010. Main memory 1015 can also be used for storing seismic data, binning function data, images, reports, tuning parameters, executable code, temporary variables, or other intermediate information during execution of instructions by the processor 1010. The computing system 1000 may further include a read only memory (ROM) 1020 or other static storage device coupled to the bus 1005 for storing static information and instructions for the processor 1010. A storage device 1025, such as a solid state device, magnetic disk or optical disk, is coupled to the bus 1005 for persistently storing information and instructions.

The computing system 1000 may be coupled via the bus 1005 to a display 1035 or display device, such as a liquid crystal display, or active matrix display, for displaying information to a user. An input device 1030, such as a keyboard including alphanumeric and other keys, may be coupled to the bus 1005 for communicating information and command selections to the processor 1010. The input device 1030 can include a touch screen display 1035. The input device 1030 can also include a cursor control, such as a mouse, a trackball, or cursor direction keys, for communicating direction information and command selections to the processor 1010 and for controlling cursor movement on the display 1035.

The processes, systems and methods described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement may also be employed to execute the instructions contained in main memory 1015. In some embodiments, hard-wired circuitry may be used in place of or in combination with software instructions to effect illustrative implementations. Thus, embodiments are not limited to any specific combination of hardware circuitry and software.

Although an example computing system has been described in FIG. 10, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of" 'A' and '13' can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, indirect couplings of elements can include intervening elements and direct couplings of elements can indicate direct contact between the elements being coupled, without intervening elements. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A seismic survey system, comprising:
    a source array comprising a first sub-source array and a second sub-source array;
    a streamer coupled with the first sub-source array;
    a streamer coupled with the second sub-source array;
    a receiver array comprising a plurality of receivers, a first subset of the plurality of receivers coupled with the streamer coupled with the first sub-source array and a second subset of the plurality of receivers coupled with the streamer coupled with the second sub-source array;
    a lateral cable coupled with at least one of a first diverter or a second diverter and at least one of the first sub-source array or the second sub-source array;
    a positioning cable coupled with the first diverter and trailing from a vessel;
    a positioning cable coupled with the second diverter and trailing from the vessel;
    a power cable coupled with the first sub-source array and trailing from the vessel;
    a power cable coupled with the second sub-source array and trailing from the vessel; and
    a seismic data acquisition unit array including a plurality of seismic data acquisition units disposed on a seabed, each seismic data acquisition unit of the plurality of seismic data acquisition units spaced a threshold distance apart.

2. The seismic survey system of claim 1, wherein the streamer coupled with the first sub-source array is a first streamer coupled with the first sub-source array, and wherein the streamer coupled with the second sub-source array is a first streamer coupled with the second sub-source array, the seismic survey system comprising:
    a second streamer coupled with the first sub-source array;
    a second streamer coupled with the second sub-source array;

a third subset of the plurality of receivers coupled with the second streamer coupled with the first sub-source array; and a fourth subset of the plurality of receivers coupled with the second streamer coupled with the second sub-source array.

3. The seismic survey system of claim 1, comprising:

the first sub-source array comprising a first float of the first sub-source array, a second float of the first sub-source array, and a third float of the first sub-source array; and the second sub-source array comprising a first float of the second sub-source array, a second float of the second sub-source array, and a third float of the second sub-source array.

4. The seismic survey system of claim 1, wherein the streamer coupled with the first sub-source array is a first streamer coupled with the first sub-source array, and wherein the streamer coupled with the second sub-source array is a first streamer coupled with the second sub-source array, the seismic survey system comprising:

the first sub-source array comprising a first float of the first sub-source array, a second float of the first sub-source array, and a third float of the first sub-source array;

the second sub-source array comprising a first float of the second sub-source array, a second float of the second sub-source array, and a third float of the second sub-source array;

a second streamer coupled with the first sub-source array;

a second streamer coupled with the second sub-source array;

a third subset of the plurality of receivers coupled with the second streamer coupled with the first sub-source array; and a fourth subset of the plurality of receivers coupled with the second streamer coupled with the second sub-source array.

5. The seismic survey system of claim 1, wherein the streamer coupled with the first sub-source array is a first streamer, and wherein the streamer coupled with the second sub-source array is a second streamer, the seismic survey system comprising:

the first sub-source array comprising a first float of the first sub-source array, a second float of the first sub-source array, and a third float of the first sub-source array;

the second sub-source array comprising a first float of the second sub-source array, a second float of the second sub-source array, and a third float of the second sub-source array;

the first streamer coupled with the first float of the first sub-source array;

the second streamer coupled with the first float of the second sub-source array;

a third streamer coupled with the first sub-source array;

a fourth streamer coupled with the second sub-source array;

a third subset of the plurality of receivers coupled with the third streamer; and a fourth subset of the plurality of receivers coupled with the fourth streamer.

6. The seismic survey system of claim 1, wherein the streamer coupled with the first sub-source array is a first streamer, and wherein the streamer coupled with the second sub-source array is a second streamer, the seismic survey system comprising:

the first sub-source array comprising a first float of the first sub-source array, a second float of the first sub-source array, and a third float of the first sub-source array;

the second sub-source array comprising a first float of the second sub-source array, a second float of the second sub-source array, and a third float of the second sub-source array;

the first streamer coupled with the first float of the first sub-source array;

the second streamer coupled with the first float of the second sub-source array;

a third streamer coupled with the third float of the first sub-source array; and a fourth streamer coupled with the third float of the second sub-source array.

7. The seismic survey system of claim 1, wherein the streamer coupled with the first sub-source array is a first streamer, and wherein the streamer coupled with the second sub-source array is a second streamer, the seismic survey system comprising:

the first sub-source array comprising a first float of the first sub-source array, a second float of the first sub-source array, and a third float of the first sub-source array;

the second sub-source array comprising a first float of the second sub-source array, a second float of the second sub-source array, and a third float of the second sub-source array;

a third streamer coupled with the third float of the first sub-source array;

a fourth streamer coupled with the third float of the second sub-source array;

a third subset of the plurality of receivers coupled with the third streamer; and a fourth subset of the plurality of receivers coupled with the fourth streamer.

8. The seismic survey system of claim 1, wherein the power cable coupled with the first sub-source array is a first power cable, and the power cable coupled with the second sub-source array is a second power cable, the seismic survey system comprising:

the first sub-source array comprising a first float of the first sub-source array, a second float of the first sub-source array, and a third float of the first sub-source array;

the second sub-source array comprising a first float of the second sub-source array, a second float of the second sub-source array, and a third float of the second sub-source array;

the first power cable coupled with the first float of the first sub-source array;

the second power cable coupled with the first float of the second sub-source array;

a third power cable coupled with the second float of the first sub-source array;

a fourth power cable coupled with the second float of the second sub-source array;

a fifth power cable coupled with the third float of the first sub-source array; and a sixth power cable coupled with the third float of the second sub-source array.

9. The seismic survey system of claim 1, comprising:

the source array to generate an acoustic signal; and the receiver array to receive reflection data generated by the acoustic signal.

10. The seismic survey system of claim 1, comprising:
the source array to generate an acoustic signal; and
the seismic data acquisition unit array to receive reflection data generated by the acoustic signal.

11. The seismic survey system of claim 1, comprising:
the source array to generate an acoustic signal;
the receiver array to receive reflection data generated by the acoustic signal; and
the seismic data acquisition unit array to receive reflection data generated by the acoustic signal.

12. The seismic survey system of claim 1, comprising:
the threshold distance greater than 50 meters.

13. The seismic survey system of claim 1, comprising:
a data processing system having one or more processors, the data processing system to:
initiate a source shot of the first sub-source array; and
initiate a source shot of the second sub-source array.

14. The seismic survey system of claim 1, comprising:
the streamer coupled with the first sub-source array less than 200 meters; and
the streamer coupled with the second sub-source array less than 200 meters.

15. A seismic survey method, comprising:
deploying a source array comprising a streamer coupled with a first sub-source array and a streamer coupled with a second sub-source array;
deploying a receiver array comprising a plurality of receivers, a first subset of the plurality of receivers coupled with the streamer coupled with the first sub-source array and a second subset of the plurality of receivers coupled with the streamer coupled with the second sub-source array;
providing a lateral cable coupled with at least one of a first diverter or a second diverter and at least one of the first sub-source array or the second sub-source array;
providing a positioning cable coupled with the first diverter and trailing from a vessel and a positioning cable coupled with the second diverter and trailing from the vessel;
providing a plurality of power cables, trailing from the vessel, coupled with at least one of the first sub-source array or the second sub-source array; and
providing a seismic data acquisition unit array including a plurality of seismic data acquisition units disposed on a seabed, each seismic data acquisition unit of the plurality of seismic data acquisition units spaced a threshold distance apart.

16. The seismic survey method of claim 15, comprising:
towing, by the vessel, the source array and the receiver array in a tow direction.

17. The seismic survey method of claim 15, comprising:
disposing the source array at a first depth of a body of water; and
disposing the receiver array at a second depth of the body of water, the second depth deeper than the first depth.

18. The seismic survey method of claim 15, comprising:
generating, by the source array, an acoustic signal;
receiving, by the receiver array, reflection data generated by the acoustic signal; and
receiving, by the seismic data acquisition unit array, reflection data generated by the acoustic signal.

19. The seismic survey method of claim 15, comprising:
initiating, by a data processing system, a source shot of the first sub-source array; and
initiating, by the data processing system, a source shot of the second sub-source array.

20. A seismic survey method, comprising:
providing a seismic survey system, comprising:
a source array comprising a first sub-source array and a second sub-source array;
a streamer to couple with the first sub-source array;
a streamer to couple with the second sub-source array;
a receiver array comprising a plurality of receivers, a first subset of the plurality of receivers to couple with the streamer coupled with the first sub-source array and a second subset of the plurality of receivers to couple with the streamer coupled with the second sub-source array;
a lateral cable to couple with at least one of a first diverter or a second diverter and at least one of the first sub-source array or the second sub-source array;
a positioning cable to couple with the first diverter and trailing from a vessel;
a positioning cable to couple with the second diverter and trailing from the vessel;
a power cable to couple with the first sub-source array and trailing from the vessel;
a power cable to couple with the second sub-source array and trailing from the vessel; and
a seismic data acquisition unit array including a plurality of seismic data acquisition units disposed on a seabed, each seismic data acquisition unit of the plurality of seismic data acquisition units spaced a threshold distance apart.

* * * * *